United States Patent
Iwata et al.

(10) Patent No.: US 10,723,880 B2
(45) Date of Patent: Jul. 28, 2020

(54) CYANATE ESTER RESIN COMPOSITION AND PREPREG

(71) Applicant: The Yokohama Rubber Co., LTD., Minato-ku, Tokyo (JP)

(72) Inventors: Mitsuhiro Iwata, Hiratsuka (JP); Yukihiro Kamimura, Hiratsuka (JP); Tomohiro Ito, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/494,281

(22) PCT Filed: Feb. 28, 2018

(86) PCT No.: PCT/JP2018/007445
§ 371 (c)(1),
(2) Date: Sep. 13, 2019

(87) PCT Pub. No.: WO2018/168461
PCT Pub. Date: Sep. 20, 2018

(65) Prior Publication Data
US 2020/0071524 A1 Mar. 5, 2020

(30) Foreign Application Priority Data
Mar. 13, 2017 (JP) .................. 2017-046905

(51) Int. Cl.
| | | |
|---|---|---|
| C08L 79/00 | (2006.01) | |
| C08L 51/04 | (2006.01) | |
| C08K 3/36 | (2006.01) | |
| C08K 5/00 | (2006.01) | |
| C08K 5/315 | (2006.01) | |
| C08J 5/24 | (2006.01) | |
| C08G 73/00 | (2006.01) | |
| C08K 3/013 | (2018.01) | |

(52) U.S. Cl.
CPC .............. *C08L 79/00* (2013.01); *C08J 5/24* (2013.01); *C08K 3/013* (2018.01); *C08K 3/36* (2013.01); *C08K 5/0025* (2013.01); *C08K 5/3155* (2013.01); *C08L 51/04* (2013.01); *C08K 2201/005* (2013.01); *C08L 2207/53* (2013.01)

(58) Field of Classification Search
None
See application file for complete search history.

(56) References Cited

U.S. PATENT DOCUMENTS

| | | | | |
|---|---|---|---|---|
| 8,815,401 | B2 * | 8/2014 | Kato | ............... C08L 79/04 |
| | | | | 428/413 |
| 9,512,329 | B2 * | 12/2016 | Nobukuni | ........... H05K 1/0353 |
| 2011/0139496 | A1 | 6/2011 | Nakamura et al. | |
| 2012/0077401 | A1 | 3/2012 | Kotake et al. | |
| 2015/0203715 | A1 | 7/2015 | Kotake et al. | |
| 2017/0002191 | A1 * | 1/2017 | Meier | ................ C08G 59/56 |
| 2017/0282516 | A1 | 10/2017 | Teranishi et al. | |
| 2017/0326819 | A1 * | 11/2017 | Meegan | ................ C08L 63/00 |

FOREIGN PATENT DOCUMENTS

| | | |
|---|---|---|
| JP | S62-146927 | 6/1987 |
| JP | 2009-013254 | 1/2009 |
| JP | 2011-099094 | 5/2011 |
| JP | 2013-064136 | 4/2013 |
| JP | 2016-210993 | 12/2016 |
| WO | WO 2010/110433 | 9/2010 |
| WO | WO 2016/060166 | 4/2016 |

OTHER PUBLICATIONS

International Search Report for International Application No. PCT/JP2018/007445 dated May 22, 2018, 4 pages, Japan.

* cited by examiner

*Primary Examiner* — Tae H Yoon
(74) *Attorney, Agent, or Firm* — Thorpe North & Western

(57) ABSTRACT

A cyanate ester resin composition contains: a cyanate ester resin; a curing agent or a curing accelerator; silica microparticles; and core-shell rubber particles; in which the resin composition includes from 1 to 5 parts by mass of the silica microparticles and from 2 to 10 parts by mass of the core-shell rubber particles based on 100 parts by mass of the cyanate ester resin, and a mass ratio of the silica microparticles to the core-shell rubber particles is from 1/1 to 1/5.

8 Claims, No Drawings

CYANATE ESTER RESIN COMPOSITION AND PREPREG

This application is the U.S. national phase of International Application No. PCT/JP2018/007445 filed Feb. 28, 2018 and claims priority to Japanese Application No. 2017-046905 filed Mar. 13, 2017, the entire contents of each of which are hereby incorporated by reference.

TECHNICAL FIELD

The present technology relates to a cyanate ester resin composition and a prepreg.

BACKGROUND ART

Fiber-reinforced composite materials with thermosetting resins including epoxy resins as a matrix are known. For example, Japan Unexamined Patent Publication No. 2011-99094 discloses an epoxy resin composition containing an epoxy resin as a matrix, a thermoplastic resin for viscosity adjustment, a filler, and a curing agent, and a prepreg obtained by combining the composition and a reinforcing fiber. Such a prepreg is used in a wide range of fields including structural materials such as aircrafts and vehicles, reinforcing of concrete structures, sports fields such as golf clubs, tennis rackets, and fishing rods because of its lightness and excellent mechanical properties.

One of the characteristics required for the prepreg used in such applications includes heat resistance. Therefore, various fiber-reinforced composite materials having a resin with higher heat resistance than epoxy resins as a matrix have been investigated.

Resins that may substitute for epoxy resins include cyanate ester resins. Cyanate ester resins have superior heat resistance than epoxy resins, and can withstand heat up to near 300° C., for example.

However, cyanate ester resins have the problem that the thermoplastic resin for viscosity adjustment is difficult to dissolve, the viscosity adjustment of the resin composition is difficult, and the resin has a high viscosity at room temperature but has a low viscosity during curing heating. Due to this problem, when the prepreg is heat cured, the resin composition flows out of the reinforcing fiber, and resin defects occur in the obtained fiber-reinforced composite material, and the thickness is non-even. In order to suppress resin flow during curing, the viscosity of the resin composition needs to be higher, but in this case, the viscosity of the resin composition at room temperature is too high, so the workability during prepreg molding will be negatively affected.

SUMMARY

The present technology provides a cyanate ester resin composition that can suppress the resin flow during heating and curing without adding a thermoplastic resin for viscosity adjustment, eliminate resin defects and uneven thickness, and have excellent workability, and to provide a prepreg using the same.

As a result of diligent research, the present inventors discovered a solution including adding a curing agent or a curing accelerator, silica microparticles, and core-shell rubber particles to a cyanate ester resin and limiting the compounding ratio of silica microparticles and core-shell rubber particles with respect to cyanate ester resin to a specified ratio.

The present technology is described as follows.

1. A cyanate ester resin composition, containing: a cyanate ester resin (A); a curing agent or a curing accelerator (B); silica microparticles (C); and core-shell rubber particles (D); in which the resin composition includes: from 1 to 5 parts by mass of the silica microparticles (C) and from 2 to 10 parts by mass of the core-shell rubber particles (D) based on 100 parts by mass of the cyanate ester resin (A), and a mass ratio of the silica microparticles (C) to the core-shell rubber particles (D) is from 1/1 to 1/5 as (C)/(D).

2. The cyanate ester resin composition according to 1, in which a tan δ at a strain 1% is less than 1 and a tan δ at a strain 100% is 1 or greater when viscoelasticity is measured at a temperature of 70° C. and a frequency 1 Hz on a parallel plate.

3. The cyanate ester resin composition according to 1, in which the cyanate ester resin (A) is a novolac type cyanate ester resin.

4. The cyanate ester resin composition according to 1, in which a compounded amount of the silica microparticles (C) per 100 parts by mass of the cyanate ester resin (A) is from 2 to 4 parts by mass.

5. The cyanate ester resin composition according to 1, in which a compounded amount of the core-shell rubber particles (D) per 100 parts by mass of the cyanate ester resin (A) is from 4 to 8 parts by mass.

6. The cyanate ester resin composition according to 1, in which a mass ratio of the silica microparticles (C) to the core-shell rubber particles (D) is from 1/1.5 to 1/4 as (C)/(D).

7. A prepreg containing the cyanate ester resin composition described in any one of 1 to 6 and a reinforcing fiber.

8. The prepreg according to 7, in which a content of the cyanate ester resin composition in the prepreg is from 30 to 60 mass %.

According to the present technology, because the curing agent or the curing accelerator (B), the silica microparticles (C), and the core-shell rubber particles (D) are added to the cyanate ester resin (A), and the compounding ratio of the silica microparticles (C) and the core-shell rubber particles (D) to the cyanate ester resin (A) is limited into a specified ratio, the cyanate ester resin composition that can suppress the resin flow during heating and curing without adding a thermoplastic resin for viscosity adjustment, eliminate resin defects and uneven thickness, and have excellent workability can be provided.

In addition, the cyanate ester resin composition of the present technology in which a tan δ at a strain 1% is less than 1 and a tan δ at a strain 100% is 1 or greater when viscoelasticity is measured at a temperature of 70° C. and a frequency 1 Hz on a parallel plate has excellent suppression of the resin flow during heating and curing, the elimination of resin defects and uneven thickness, and workability.

Furthermore, the prepreg formed from the cyanate ester resin composition and the reinforcing fiber has excellent heat resistance, and also has excellent mechanical strength because resin defects and uneven thickness are also suppressed.

DETAILED DESCRIPTION

Hereinafter, embodiments of the present technology will be described in more detail.

(A) Cyanate Ester Resin

The cyanate ester resin (A) used in the present technology is not particularly limited. Generally, the cyanate ester resin is represented by the following formula:

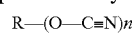

(R represents a divalent or higher organic group having an aromatic ring, and n represents an integer of 2 or greater).

Examples of such cyanate ester resins include novolac type, bisphenol A type, bisphenol E type, and bisphenol F type cyanate ester resins. Among them, novolac type cyanate ester resins are preferred.

Commercially available novolac type resins can be used, and examples thereof include PRIMASET PT-30 and PRIMASET PT-60 available from LONZA Japan.

(B) Curing Agent or Curing Accelerator

The curing agent or curing accelerator (B) used in the present technology is not particularly limited as long as it is capable of promoting thermal curing of the cyanate ester resin, but examples include metal complexes such as cobalt or copper, alcohols, acids, amines, bases, and the like.

(C) Silica Microparticles

The silica microparticles (C) are preferably hydrophilic silica microparticles. Examples include non-crystalline synthetic silica such as precipitated silica, gel-method silica, pyrolyzing silica, and fused silica; crystalline synthetic silica; and natural silica.

The average primary particle size of the silica microparticles (C) is preferably from 5 nm to 100 nm.

(D) Core-Shell Rubber Particles

The core-shell rubber particles (D) used in the present technology are known, and can be, for example, particles obtained by graft polymerization of a shell component polymer that is different from the core component on the surface of the particulate core component containing a crosslinked rubber-like polymer as a main component.

Examples of the core component include butadiene rubber, acrylic rubber, silicone rubber, butyl rubber, NBR (nitrile butadiene rubber), SBR (styrene butadiene rubber), IR (isoprene rubber), and EPR (ethylene propylene rubber).

Example of the shell component includes a polymer obtained by polymerizing a monomer selected from acrylic acid ester-based monomers, methacrylic acid ester-based monomers, aromatic vinyl monomers, and the like.

The average particle size of the core-shell rubber particles (D) is, for example, from 10 nm to 10 μm, and preferably from 100 nm to 500 nm.

Compounding Ratio

The cyanate ester resin composition of the present technology is required that from 1 to 5 parts by mass of silica microparticles (C) and from 2 to 10 parts by mass of core-shell rubber particles (D) is included based on 100 parts by mass of the cyanate ester resin (A), and a mass ratio of silica microparticles (C) to core-shell rubber particles (D) is from 1/1 to 1/5 as (C)/(D).

(C) In a case where the compounding ratio of the silica microparticles (C) is less than 1 part by mass or the compounding ratio of the core-shell rubber particles (D) is less than 2 parts by mass, the suppression of the resin flow is insufficient, and the effect of the present technology cannot be achieved.

(C) In a case where the compounding ratio of the silica microparticles (C) exceeds 5 parts by mass, or the compounding ratio of the core-shell rubber particles (D) exceeds 10 parts by mass, the viscosity of the resin composition increases, the workability is negatively affected, and the mechanical properties (mainly elastic modulus) of the cured product will decline.

(C) In a case where the mass ratio of the silica microparticles (C) to the core-shell rubber particles (D) is greater than 1/1 as (C)/(D), that is, when the compounded amount of the component (D) is smaller than that of the component (C), the resin flow is insufficient, and the effect of the present technology cannot be achieved.

(C) In a case where the mass ratio of the silica microparticles (C) to the core-shell rubber particles (D) is less than 1/5 as (C)/(D), that is, when the compounded amount of the component (D) is too high with respect to that of the component (C), the resin flow suppression effect will be too high, so the workability during prepreg molding will be negatively affected.

In the present technology, the compounded amount of the silica microparticles (C) per 100 parts by mass of the cyanate ester resin (A) is more preferably from 2 to 4 parts by mass, and the compounded amount of the core-shell rubber particles (D) is more preferably from 4 to 8 parts by mass, and the mass ratio of the silica microparticles (C) to the core-shell rubber particles (D) is more preferably from 1/1.5 to 1/4 as (C)/(D).

Since in the cyanate ester resin composition of the present technology, a tan δ at the strain 1% is less than 1 and a tan δ at a strain 100% is 1 or greater when viscoelasticity is measured at a temperature of 70° C. and a frequency 1 Hz on a parallel plate, the resin has excellent suppression of the resin flow during heating and curing, the elimination of resin defects and uneven thickness, and workability. Note that the measurement of viscoelasticity can be measured by using the trade name ARES manufactured by TA Instruments. Furthermore, the viscoelasticity described above can be achieved by appropriately setting the compounded amount of the silica microparticles (C) and the core-shell rubber particles (D) to the cyanate ester resin as described above.

The cyanate ester resin composition of the present technology can include other additives as needed. Examples of the additives include fillers, anti-aging agents, solvents, flame retardants, reaction retarders, antioxidants, pigments (dyes), plasticizers, thixotropic agents, UV (ultraviolet) absorbents, surfactants (including leveling agents), dispersants, dewatering agents, adhesion promoters, and anti-static agents.

The prepreg of the present technology comprises the cyanate ester resin composition of the present technology and the reinforcing fiber.

Specifically, the prepreg of the present technology is obtained by impregnating the reinforcing fiber with the cyanate ester resin composition of the present technology.

The reinforcing fiber used in the prepreg of the present technology is not particularly limited, and examples thereof include known products. Of these, from the perspective of strength, the reinforcing fiber is preferably at least one selected from the group consisting of carbon fiber, glass fiber, and aramid fiber.

The form of the fiber is not particularly limited, and examples thereof include roving, fiber obtained by lining up roving, woven fabric, nonwoven fabric, knitted fabric, and tulle.

A method of manufacturing the prepreg of the present technology is not particularly limited. Examples thereof include wet methods using a solvent and hot-melt methods (solvent-free methods). From the perspective of being able to reduce drying time, an amount of the solvent used is preferably from 80 to 200 parts by mass per 100 parts by mass of the solid content of the cyanate ester resin composition.

In the prepreg of the present technology, the content of cyanate ester resin composition is preferably from 30 to 60 mass % in the prepreg from the perspective of the mechanical properties of the resulting fiber-reinforced composite material.

Use of the prepreg of the present technology is not particularly limited. For example, a known fiber-reinforced composite material can be obtained by curing the prepreg of the present technology. Specific examples of uses include aircraft parts (e.g. fairings, flaps, leading edges, floor panels, propellers, fuselages, and the like); two-wheel vehicle parts (e.g. motorcycle frames, cowls, fenders, and the like); automobile parts (e.g. doors, bonnets, tailgates, side fenders, side panels, fenders, energy absorbers, trunk lids, hard tops, side mirror covers, spoilers, diffusers, ski carriers, engine cylinder covers, engine hoods, chassis, air spoilers, propeller shafts, and the like); vehicle exterior plating (e.g. lead car noses, roofs, side panels, doors, truck bed covers, side skirts, and the like); railroad vehicle parts (e.g. luggage racks, seats, and the like); aero parts (e.g. side skirts and the like mounted on automobiles and rigid vehicles such as interior design elements, inner panels, outer panels, roofs, and floors of wings on wing trucks, and the like); use as housings (e.g. notebook computers, portable phones, and the like); medical uses (e.g. X-ray cassettes, table tops, and the like); audio product uses (e.g. flat speaker panels, speaker cones, and the like); sports goods uses (e.g. golf club heads, face masks, snowboards, surf boards, protectors, and the like); and general industrial uses (e.g. flat springs, windmill blades, and elevators (compartment panels, doors).

Additionally, a fiber-reinforced composite material can be fabricated by layering the prepreg of the present technology and another member (e.g. a honeycomb core). Examples of the fiber-reinforced composite material that can be fabricated by layering the prepreg of the present technology and another member include honeycomb sandwich panels.

Example

The present technology will be described in further detail by way of examples and comparative examples, but the present technology is not limited by these examples.

The following materials were used in the examples below.

(A) Cyanate ester resin: PRIMASET PT-30 and PRIMASET PT-60 manufactured by LONZA Japan (novolac type cyanate ester resin)

(B) Curing agent or curing accelerator: DICY-15 (dicyandiamide) available from Mitsubishi Chemical Corporation (C) Silica microparticles: CAB-O-SIL M5 (hydrophilic fumed silica) available from Cabot Corporation (D) Core-shell rubber particles: MX-154 (Epoxy Resin/Core-Shell Rubber Particle Master Batch, containing 40 mass % of butadiene-based core-shell rubber particles)

Various cyanate ester resin compositions were prepared by kneading each of the materials using a kneader at 70° C. according to the compounding ratio (parts by mass) shown in Table 1 below.

The following measurements were performed on the various cyanate ester resin compositions obtained.

Viscoelasticity: The tan δ at strain 1% or 100% was measured on a parallel plate under conditions of a temperature of 70° C. and a frequency of 1 Hz using ARES available from TA Instruments.

Molding Prepreg

The cyanate ester resin composition film (resin weight 104 g/m$^2$) was impregnated into the glass fiber fabric (fiber basis weight 156 g/m$^2$) to mold a prepreg. The cyanate ester resin composition in the molded prepreg is 40 mass %.

Resin flow: The prepreg was cut into 100 mm×100 mm, and four sheets of cut prepregs were laminated, and pressed at a temperature of 180° C. and a pressure of 3 kgf/cm$^2$ for 30 min. The weight of the resin cured product protruded from the fiber was measured, and the resin flow was calculated using the following equation.

Resin flow (%)=(weight of protruded resin cured product)/(weight of laminate before pressing)×100

Workability: The workability when preparing the cyanate ester resin composition film and when impregnating the glass fiber fabric was evaluated according to the following evaluation criteria.

Good: Good film preparing and good impregnability to glass fiber fabric

Poor: Prepreg cannot be molded due to difficulty in preparing the film

Dimensional Stability: The prepreg was cut into 300 mm×300 mm, ten sheets of cut prepregs were laminated, and cured in an autoclave at 180° C. for 2 hours to obtain a fiber-reinforced composite material. The thickness of the obtained fiber-reinforced composite material was measured. When the difference between the maximum thickness and the minimum thickness was 5% or less of the maximum thickness, the dimensional stability was determined to be good.

The results are shown in Table 1. The values of each of the examples in Table 1 represent parts by mass.

TABLE 1

| Material | Product name | Example 1 | Example 2 | Example 3 | Example 4 |
| --- | --- | --- | --- | --- | --- |
| (A) Cyanate ester resin | PT-30 | 100 | 70 | 70 | 70 |
|  | PT-60 | — | 30 | 30 | 30 |
| (B) Curing agent or curing accelerator | DICY-15 | 1 | 1 | 1 | 1 |
| (C) Silica microparticles | CAB-O-SIL M5 | 2 | 2 | 4 | 2 |
| (D) Epoxy resin/core-shell rubber particle master batch | MX-154 | 10 | 10 | 10 | 25 |
| Core-shell rubber particles in the master batch |  | 4 | 4 | 4 | 10 |
| Viscoelasticity (strain 1%) | — | 0.10 | 0.22 | 0.08 | 0.16 |
| Viscoelasticity (strain 100%) | — | 1.05 | 2.57 | 1.11 | 1.89 |
| Resin Flow (%) | — | 8.3 | 12.4 | 9.0 | 11.2 |
| Workability | — | Good | Good | Good | Good |
| Dimensional Stability (%) | — | 4.3 | 4.8 | 3.9 | 4.6 |

TABLE 1-continued

| Material | Product name | Comparative Example 1 | Comparative Example 2 | Comparative Example 3 | Comparative Example 4 |
|---|---|---|---|---|---|
| (A) Cyanate ester resin | PT-30 | 100 | 100 | 70 | 70 |
|  | PT-60 | — | — | 30 | 30 |
| (B) Curing agent or curing accelerator | DICY-15 | 1 | 1 | 1 | 1 |
| (C) Silica microparticles | CAB-O-SIL M5 | 2 | — | 1 | 6 |
| (D) Epoxy resin/core-shell rubber particle master batch | MX-154 | — | 10 | 2.5 | 30 |
| Core-shell rubber particles in the master batch |  | — | 4 | 1 | 12 |
| Viscoelasticity (strain 1%) | — | 40.23 | 2.25 | 23.92 | 0.07 |
| Viscoelasticity (strain 100%) | — | 42.68 | 4.10 | 27.14 | 0.63 |
| Resin Flow (%) | — | 24.5 | 18.4 | 20.5 | 4.3 |
| Workability | — | Good | Good | Good | Poor |
| Dimensional Stability (%) | — | 12.9 | 10.3 | 9.5 | — |

From the results shown in Table 1, it was found that the cyanate ester resin composition of each Examples in which the curing agent or the curing accelerator (B), the silica microparticles (C), and the core-shell rubber particles (D) are added to the cyanate ester resin (A), and the compounding ratio of the silica microparticles (C) and the core-shell rubber particles (D) to the cyanate ester resin (A) is limited into a specified ratio of the present technology can suppress the resin flow during heating and curing without adding a thermoplastic resin for viscosity adjustment, eliminate resin defects and uneven thickness, and has excellent workability. Additionally, since in the cyanate ester resin composition of each Examples, a tan δ at a strain 1% is less than 1 and a tan δ at a strain 100% is 1 or greater when viscoelasticity is measured at a temperature of 70° C. and a frequency 1 Hz on a parallel plate, the resin composition is solid-like at low strain (tan δ of less than 1) and can suppress the resin flow during heating and curing, and is liquid-like at high strain (tan δ of 1 or greater) and has good workability during film applying and impregnating.

In contrast, in Comparative Example 1, the results of resin flow and dimensional stability were negatively affected because the core-shell rubber particles (D) were not added.

In Comparative Example 2, the results of resin flow and dimensional stability were negatively affected because the silica microparticles (C) were not added.

In Comparative Example 3, the results of resin flow and dimensional stability were negatively affected because the compounded amount of the core-shell rubber particles (D) was less than the lower limit specified in the present technology.

In Comparative Example 4, the results of workability was negatively affected because the compounded amount of the silica microparticles (C) and the compounded amount of the core-shell rubber particles (D) are both beyond the upper limit specified in the present technology.

The invention claimed is:

1. A cyanate ester resin composition, comprising:
a cyanate ester resin (A);
a curing agent or a curing accelerator (B);
silica microparticles (C); and
core-shell rubber particles (D), wherein
the resin composition includes from 1 to 5 parts by mass of the silica microparticles (C) and from 2 to 10 parts by mass of the core-shell rubber particles (D) based on 100 parts by mass of the cyanate ester resin (A), and
a mass ratio of the silica microparticles (C) to the core-shell rubber particles (D) is from 1/1 to 1/5 as (C)/(D).

2. The cyanate ester resin composition according to claim 1, wherein a tan δ at a strain 1% is less than 1 and a tan δ at a strain 100% is 1 or greater when viscoelasticity is measured at a temperature of 70° C. and a frequency 1 Hz on a parallel plate.

3. The cyanate ester resin composition according to claim 1, wherein the cyanate ester resin (A) is a novolac type cyanate ester resin.

4. The cyanate ester resin composition according to claim 1, wherein a compounded amount of the silica microparticles (C) per 100 parts by mass of the cyanate ester resin (A) is from 2 to 4 parts by mass.

5. The cyanate ester resin composition according to claim 1, wherein a compounded amount of the core-shell rubber particles (D) per 100 parts by mass of the cyanate ester resin (A) is from 4 to 8 parts by mass.

6. The cyanate ester resin composition according to claim 1, wherein a mass ratio of the silica microparticles (C) to the core-shell rubber particles (D) is from 1/1.5 to 1/4 as (C)/(D).

7. A prepreg comprising the cyanate ester resin composition described in claim 1 and a reinforcing fiber.

8. The prepreg according to claim 7, wherein a content of the cyanate ester resin composition in the prepreg is from 30 to 60 mass %.

* * * * *